United States Patent
Yamada et al.

(10) Patent No.: US 12,218,960 B2
(45) Date of Patent: Feb. 4, 2025

(54) INFORMATION COLLECTION SYSTEM, INFORMATION COLLECTION METHOD, MEDIUM, AND INFORMATION COLLECTION PROGRAM

(71) Applicants: NEC CORPORATION, Tokyo (JP); B.G. Negev Technologies and Applications Ltd., at Ben-Gurion University, Beer Sheva (IL)

(72) Inventors: Yoshiyuki Yamada, Tokyo (JP); Masaki Inokuchi, Tokyo (JP); Yoshinobu Ohta, Tokyo (JP); Yuval Elovici, Arugot (IL); Asaf Shabtai, Hulda (IL); Ron Bitton, Yehud (IL)

(73) Assignees: NEC CORPORATION, Tokyo (JP); B.G. NEGEV TECHNOLOGIES AND APPLICATIONS LTD., Beer Sheva (IL)

(*) Notice: Subject to any disclaimer, the term of this patent is extended or adjusted under 35 U.S.C. 154(b) by 878 days.

(21) Appl. No.: 16/973,596

(22) PCT Filed: Jun. 12, 2018

(86) PCT No.: PCT/JP2018/023049
§ 371 (c)(1),
(2) Date: Dec. 9, 2020

(87) PCT Pub. No.: WO2019/239608
PCT Pub. Date: Dec. 19, 2019

(65) Prior Publication Data
US 2021/0243213 A1    Aug. 5, 2021

(51) Int. Cl.
*H04L 9/40* (2022.01)
*H04L 101/695* (2022.01)

(52) U.S. Cl.
CPC ...... *H04L 63/1425* (2013.01); *H04L 63/0236* (2013.01); *H04L 63/101* (2013.01);
(Continued)

(58) Field of Classification Search
CPC ............ H04L 63/1425; H04L 63/0236; H04L 63/101; H04L 63/108; H04L 63/1433; H04L 2101/695
(Continued)

(56) References Cited

U.S. PATENT DOCUMENTS 8,621,634 B2* 12/2013 Turbin .................. G06F 21/564
706/62
9,622,161 B1* 4/2017 Law ...................... H04W 48/16
(Continued)

FOREIGN PATENT DOCUMENTS

CN 104821950 A 8/2015
CN 106972933 A * 7/2017 ......... H04L 63/0236
(Continued)

OTHER PUBLICATIONS

Wu, SMART: a scan-based movement-assisted sensor deployment method in wireless sensor networks, 2005 (Year: 2005).*
(Continued)

*Primary Examiner* — Luu T Pham
*Assistant Examiner* — Saad Ahmad Abdullah
(74) *Attorney, Agent, or Firm* — Sughrue Mion, PLLC

(57) ABSTRACT

An information collection system includes: a side-channel information processing unit that derives load information to estimate an impact on the availability of a target machine for active scanning by using side-channel data; an allow list generation unit that generates an allow list including a scan timing and a scan range in which the availability is not affected, the allow list generation unit generating the allow list based on the load information; and an allow list storage
(Continued)

unit that stores the allow list. An active scan of the target machine is executed by referencing the allow list stored in the allow list storage unit to collect asset information of the target machine.

9 Claims, 11 Drawing Sheets

(52) U.S. Cl.
 CPC ........ *H04L 63/108* (2013.01); *H04L 63/1433* (2013.01); *H04L 2101/695* (2022.05)
(58) Field of Classification Search
 USPC .......................................................... 726/22
 See application file for complete search history.

(56) References Cited

U.S. PATENT DOCUMENTS

| | | | |
|---|---|---|---|
| 9,756,070 B1 * | 9/2017 | Crowell | G06F 21/56 |
| 10,885,393 B1 * | 1/2021 | Sirianni | G06F 18/2411 |
| 10,924,503 B1 * | 2/2021 | Pereira | H04L 63/20 |
| 2013/0095768 A1 | 4/2013 | Sinha | |
| 2013/0116801 A1 | 5/2013 | Chu et al. | |
| 2018/0013783 A1 | 1/2018 | Anachi | |
| 2019/0163886 A1 * | 5/2019 | Mahkonen | H04L 63/1433 |
| 2019/0207772 A1 * | 7/2019 | Hecht | H04L 63/10 |
| 2019/0273718 A1 * | 9/2019 | Ahuja | G06F 9/45558 |

FOREIGN PATENT DOCUMENTS

| | | |
|---|---|---|
| JP | 11-122245 A | 4/1999 |
| JP | 2012-44281 A | 3/2012 |
| WO | WO-2019239608 A1 * 12/2019 | ........... G06F 21/552 |

OTHER PUBLICATIONS

Office Action issued Jan. 25, 2022 in Japanese Application No. 2020-569209.
International Search Report for PCT/JP2018/023049 dated, Aug. 14, 2018 (PCT/ISA/210).

* cited by examiner

| Num-ber | IP address information | Start time of scanning allowed | End time of scanning allowed |
|---|---|---|---|
| 1 | 192.168.1.5 | 15:00:00 | 15:30:00 |
| 2 | 192.168.1.8 | 15:25:30 | 15:45:00 |
| 3 | 192.168.2.0/26 | 20:00:00 | 22:00:00 |
| 4 | 192.168.10.10 – 192.168.10.20 | 6:20:00 | 6:50:00 |
| 5 | | | |

⋮ ⋮ ⋮ ⋮

INFORMATION COLLECTION SYSTEM, INFORMATION COLLECTION METHOD, MEDIUM, AND INFORMATION COLLECTION PROGRAM

CROSS REFERENCE TO RELATED APPLICATIONS

This application is a National Stage of International Application No. PCT/JP2018/023049 filed Jun. 12, 2018.

TECHNICAL FIELD

The present invention relates to information collection system, information collection method, and information collection program.

BACKGROUND ART

Security assessment has been conducted for the purpose of improving the security of an information processing system and each device constituting the information processing system. In security assessment, it is necessary to acquire asset information such as hardware and software which constitute each device in the information processing system. In order to acquire asset information, a device for collecting information needs to access each device. Patent Document 1 discloses a technique for collecting data relating to the operation state of an object to be monitored constituting a network as a related technology.

When acquiring asset information as described above in the security assessment of the information processing system and each device constituting the information processing system, there is concern about the processing load on the evaluation target device and the labor burden on a person in charge.

An exemplary object of the present invention is to provide an information collection system, an information collection method, and an information collection program capable of solving the above-mentioned problem.

CITATION LIST

Patent Literature

[PTL 1]
Japanese Unexamined Patent Application, First Publication No. H11-122245

DISCLOSURE OF INVENTION

Technical Problem

Since many control systems install general-purpose PCs, the same approach for IT systems can also be applied to the control systems to collect the asset information by using scanning tools. Active scanning tools can also work as one aspect of a method for collecting asset information. However, the above-mentioned active scans may have an impact on the behavior of the target machine. In the control systems, exhaustive active scans cannot be performed due to a concern regarding the effect of stability, that is, availability of the entire control system. The top priority is to maintain system availability, i.e., stable operation without stopping, because control systems are incorporated in the critical infrastructures.

At the same time, it is necessary to execute security assessment continuously in order to maintain the quality of security countermeasures because conditions of the target system will change over time. Therefore, it is also important to continuously collect asset information. In order to realize a continuous scan, active scans with a fixed time interval are used typically based on periodic polling actions. However, periodic polling actions have a problem in that they do not consider the impact on the behavior of the target machine, that is, they do not consider the impact on the availability of the system.

Even though the control system will employ continuous operation without stopping, active scanning should be executed at a timing so as not to impact availability since maintenance work is necessary to ensure the stability of a system. In conventional schemes, information gathering has been conducted by launching active scanning tools manually by, for example, switching a scan range at a timing that does not affect the availability. The range to allow active scanning or to deny active scanning may be determined by designating a network address that denotes an IP address range or a subnet. For example, the decision whether or not to execute active scanning for each target machine has been made based on the scan range written in an allow address list or a deny address list.

The manual scheme to identify the scan range has a problem that it takes a long time. It is not realistic in terms of human resources to perform the periodic active scan for the purpose of continuous information collection by such a manual scheme. One possible solution to this problem is for the scanning system to have a function to update allow address lists or deny address lists automatically; however, the conventional scheme does not have such a function.

Accordingly, an objective of the present disclosure is to solve the above-mentioned problems and to provide an information collection system that automatically generates or updates an allowing range or a denying range for active scanning based on a determination of a scan range and scan timing for each machine to execute active scanning by estimating the effect on the availability of the control system.

Solution to Problem

As a first aspect of the present disclosure, an information collection system is provided including: a side-channel information processing unit for generating a load information that estimates an impact on the availability of a target machine by using side-channel data: an allow list generation unit for generating an allow list where a scan range and a scan timing that do not affect the availability are written by using the load information; and an allow list storage unit for saving the allow list: where the information collection system executes an active scan by referencing the allow list saving at the allow list storage unit, and collects asset information of target machines.

As a second aspect of the present disclosure, a computer-implemented information collection method is provided including the steps of: deriving load information to estimate an impact on the availability of a target machine for active scanning by using side-channel data: generating an allow list including a scan timing and a scan range in which the availability is not affected, the allow list being based on the load information; and storing the allow list in memory, wherein an active scan of the target machine is executed by referencing the allow list stored in memory to collect asset information of the target machine.

As a third aspect of the present disclosure, an information collection program is provided that causes a computer to execute the steps of: deriving load information to estimate an impact on the availability of a target machine for active scanning by using side-channel data: generating an allow list including a scan timing and a scan range in which the availability is not affected, the allow list being based on the load information; and storing the allow list in memory, wherein an active scan of the target machine is executed by referencing the allow list stored in memory to collect asset information of the target machine.

As a fourth aspect of the present disclosure, a non-transitory computer-readable storage medium is provided storing a program that causes a computer to execute the steps of: deriving load information to estimate an impact on the availability of a target machine for active scanning by using side-channel data: generating an allow list including a scan timing and a scan range in which the availability is not affected, the allow list being based on the load information; and storing the allow list in memory, wherein an active scan of the target machine is executed by referencing the allow list stored in memory to collect asset information of the target machine.

Advantageous Effects of Invention

According to the present disclosure, since the information collection system enables a scan that does not affect stable operation, that is, the availability of the entire control system, the information collection system can collect asset information of machines included in the control system.

EMBODIMENTS FOR CARRYING OUT THE INVENTION

Figures 1, 2:
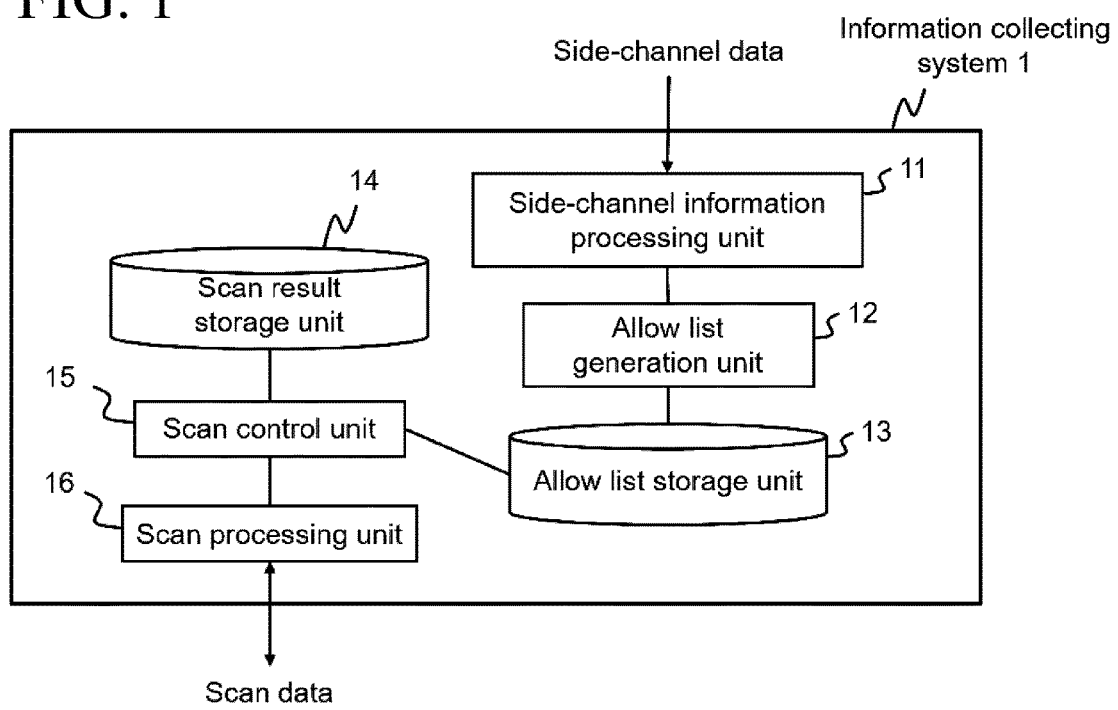
FIG. 1 is a block diagram showing an example of a functional configuration of an information collection system 1 according to a first exemplary embodiment.
FIG. 2 is an explanatory diagram showing an example of data items in an allow list generated by an allow list generation unit 12 according to the first exemplary embodiment.

Cyber-attacks to industrial control systems have been increasing, where critical infrastructures such as electric power plants, factories, and water systems are being targeted. Some incidents have occurred that have caused real damage in physical systems. Ensuring the security of industrial control systems is an urgent issue because of the significant impact such systems have on society. In order to maintain effective security countermeasures, it is necessary to identify risk factors that are equal to possible threats and vulnerabilities which compose likely and even unlikely attack tactics. Understanding such risk factors can be achieved by a security assessment of a target system to be protected. Security assessment plays an important role in improving the quality of security countermeasures since understanding attack tactics affects decision-making for a countermeasure policy.

When carrying out a security assessment, it is necessary to collect various information for analysis activities. Information that needs to be collected contains, for example, component information and configuration information relating to hardware, software, and firmware incorporated in the component equipment of the target system (hereinafter, referred to as asset information), and/or contains vulnerability information publicly released at a vulnerability information database such as the National Vulnerability Database (NVD) and the like.

Specific methods for collecting asset information may include interviewing relevant persons such as an administrator, an operator, or a developer of the target system, using scanning tools executed on computing machines for the purpose of surveying, and referencing a public database such as NVD. Especially in an information system including an office network (hereinafter, referred to as an IT system) where general-purpose personal computers (PCs) and computing machines are utilized, collecting asset information can typically be achieved by using scanning tools. Scanning tools may include, for example, NMAP for network scans, Wireshark for packet capture, OpenAudIT for gathering asset information of a target machines over the network, and OpenVAS for scanning vulnerabilities in target assets.

Some scanning tools may affects behaviors of a target machine. For example, NMAP will send a packet to the target machine and extract (or determine) the asset information based on the response packets from the target machine. When a network interface of the target machine receives the packets sent from the scanning tool, the behaviors of the target machine will be affected because some processes in the target machine are generated to deal with the packets. Such scanning activities are referred to as active scanning. NMAP, OpenAudIT, and OpenVAS may be classified as active scanning tools. Generally, active scanning tools are assumed to use in the IT system environment dominated by general-purpose PC and computing machines. NMAP may execute an active scan exhaustively for a target machine where a predetermined IP address is given, while not considering operational states of the target machine.

Exemplary embodiments of the present disclosure will be described in detail below with reference to the drawings.

Exemplary Embodiment 1

[System Structure]

FIG. 1 is a block diagram showing an example of a functional configuration of an information collection system 1 (which may also be referred to as "a security management system") corresponding to a first exemplary embodiment according to the present disclosure. As shown in FIG. 1, an information collection system 1 includes a side-channel information processing unit 11 (side-channel processor), an allow list generation unit 12 (allow list generator), an allow list storage unit 13 (allow list memory), a scan result storage unit 14 (scan result memory), a scan control unit 15 (scan controller), and a scan processing unit 16 (scan processor).

The side-channel information processing unit 11 receives side-channel data (i.e., data collected as input from the outside), processes the side-channel data to derive load information of a target machine, and then outputs the load information to the allow list generation unit 12. The side-channel data may be traffic data transmitted and received at a target machine. The side-channel data may be measured values of power consumption in a target machine. The side-channel data may be control message data or control command data included in a packet transmitted and received at a target machine.

The load information may be information that represents a load condition of a target machine. The load information may vary depending on the operational state of the target machine and may be derived from the side-channel data. When the side-channel data is traffic data, the load information may be network load information. When the side-channel data is measured values of power consumption, the load information may be energy load information. When the side-channel data is the control message data or the control command data, the load information may itself be the control message data or the control command data.

The allow list generation unit 12 receives the load information as an input from the side-channel information processing unit 11. The allow list generation unit 12 determines that an active scan is executable on a machine which has IP address associated with the load information when a predetermined condition is satisfied, and then generate an allow list where IP address information is written. The allow list generation unit 12 outputs the generated allow list to the allow list storage unit 13.

The predetermined condition is that the load information satisfies a predetermined decision criteria. The decision criteria is different depending on the type of the side-channel data that the information collection system 1 receives. When the side-channel data is traffic data, the decision criteria may be a condition that the network load information is lower than a predetermined reference value. When the side-channel data is measured values of power consumption, the decision criteria may be a condition that the energy load information is lower than a predetermined reference value. When the side-channel data is the control message data, the decision criteria may be a condition that the operating information extracted from the control message data matches a predetermined operational state of the target machine.

Further, the IP address information may be an IP address associated with the target machine for active scanning. The IP address information may be a network address that represents a subnet or an IP address range where an IP address associated with the target machine for active scanning belongs.

FIG. 2 is an explanatory diagram showing an example of data items in an allow list generated by an allow list generation unit 12 in tabular form. As shown in FIG. 2, the allow list may include at least one of an IP address, a network address that represents subnet, and an IP address range as a column item. In addition, the allow list may include a start time of allowed scanning, and an end time of allowed scanning as a column item.

By referencing the allow list, for example, the row number 1 shows that a scan to a machine whose IP address is 192.168.1.5 is executable from 15:00:00 (the start time of allowed scanning) to 15:30:00 (the end time of allowed scanning). In a similar way, the row number 3 shows that a scan to a machine whose IP address belongs to a network address specified by a subnet 192.168.2.0/26 is executable from 20:00:00 to 22:00:00. In the row number 4, it is shown that an IP address range is specified as 192.168.10.10-192.168.10.20 and scans for machines whose IP address is within this range are executable from 6:20:00 to 6:50:00. However, the allow list is not limited to a tabular form, and the allow list may be any type of format including the above-mentioned elements.

The allow list storage unit 13 receives the allow list generated by the allow list generation unit 12 and stores the latest allow list by saving or updating the allow list in a database of the allow list storage unit 13. Further, the allow list storage unit 13 sends the latest allow list from the database in response to a request from the scan control unit 15 and outputs the allow list to the scan control unit 15.

The scan result storage unit 14 receives scan data obtained by executing an active scan or asset information extracted from the scan data from the scan control unit 15. The scan result storage unit 14 stores the latest scan data or the asset information by saving or updating the scan data or the asset information in a database of the scan result storage unit 14. The asset information may be component information and configuration information relating to hardware, software, and firmware incorporated in the component equipment of the target system.

The scan control unit 15 sends a request to the allow list storage unit 13 to output an allow list and receives the allow list retrieved by the allow list storage unit 13. The scan control unit 15 may receive all data items recorded in the allow list or a subset of data items recorded in the allow list. For example, when the items described in the IP address column as shown in FIG. 2 are specified by the scan control unit 15 in requesting the output of the allow list, the allow list storage unit 13 may output only the related data items to the scan control unit 15.

The scan control unit 15 refers to the allow list received from the allow list storage unit 13 and sends a scan execution request to the scan processing unit 16 at a scan timing according to the IP address information and the information regarding possible times to scan described in the allow list. The scan timing may be the time from the start time of allowed scanning to the end time of allowed scanning written in the allow list. Moreover, the scan control unit 15 may determine frequency or speed to execute active scanning based on the information regarding the start time of allowed scanning and the end time of allowed scanning written in the allow list.

The scan control unit 15 may send IP address information combined with the scan execution request to the scan processing unit 16, where the IP address information is associated with the target machine for active scanning. The IP address information may be the information described in the IP address column in the allow list shown in FIG. 2. The IP address information may be an IP address, a network address that represents a subnet or an IP address range.

The scan control unit 15 may receive a scan data obtained by executing an active scan as an input data from the scan processing unit 16, and may output the scan data to the scan result storage unit 14. The scan control unit 15 may receive an asset information extracted from the scan data as an input data from the scan processing unit 16, and may output the asset information to the scan result storage unit 14. The asset information may be component information and/or configuration information relating to, for example, hardware, software, and firmware incorporated in the component equipment of the target system.

The scan processing unit 16 may execute an active scan in response to the scan execution request received from the scan control unit 15. The scan processing unit 16 may execute an active scan on a target machine associated with an IP address according to the IP address information attached with a scan execution request in response to the scan execution request received from the scan control unit 15. The scan processing unit 16 may send a scan packet whose destination address is an IP address attached with a scan execution request in response to the scan execution request received from the scan control unit 15.

The IP address attached with the scan execution request may be the IP address associated with the target machine described in the allow list as shown in FIG. 2. The IP address attached with the scan execution request may be an IP address which belongs to a subnet that equates to a network address described in the allow list as shown in FIG. 2. The IP address attached with the scan execution request may be an IP address included in an IP address range which is described in the allow list as shown in FIG. 2. When the information collection system 1 employs NMAP as an active scanning tool, the scan packet may be the scan packet generated by NMAP in executing an active scan. However, the tool employed in the information collection system 1 is not limited to NMAP, the tool may be OpenAudIT or OpenVAS.

The scan processing unit 16 receives a scan data generated by executing the active scan as an input data from the outside of the information collection system 1, and outputs the scan data to the scan control unit 15. In addition, the scan processing unit 16 may extracts an asset information from the scan data received as an input, and may output the asset information to the scan control unit 15. The asset information may be component information and configuration information relating to hardware, software, and firmware incorporated in the component equipment of the target system. On the other hand, the scan control unit 15 instead of the scan processing unit 16 may extract the asset information.

Figure 3:
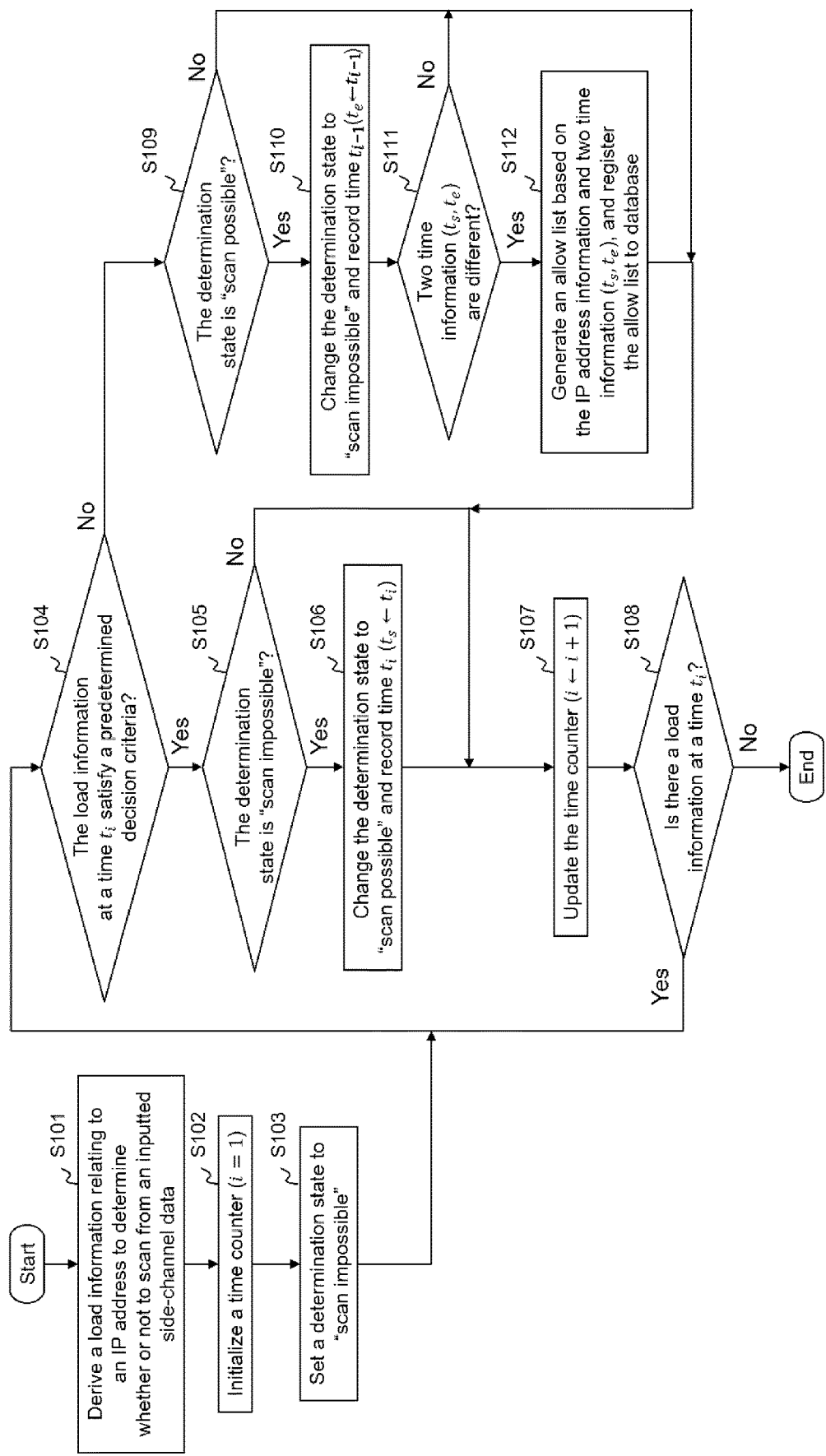
FIG. 3 is a flowchart showing an example of operation in an allow list generation phase of the information collection system 1 according to the first exemplary embodiment.
Figure 4:
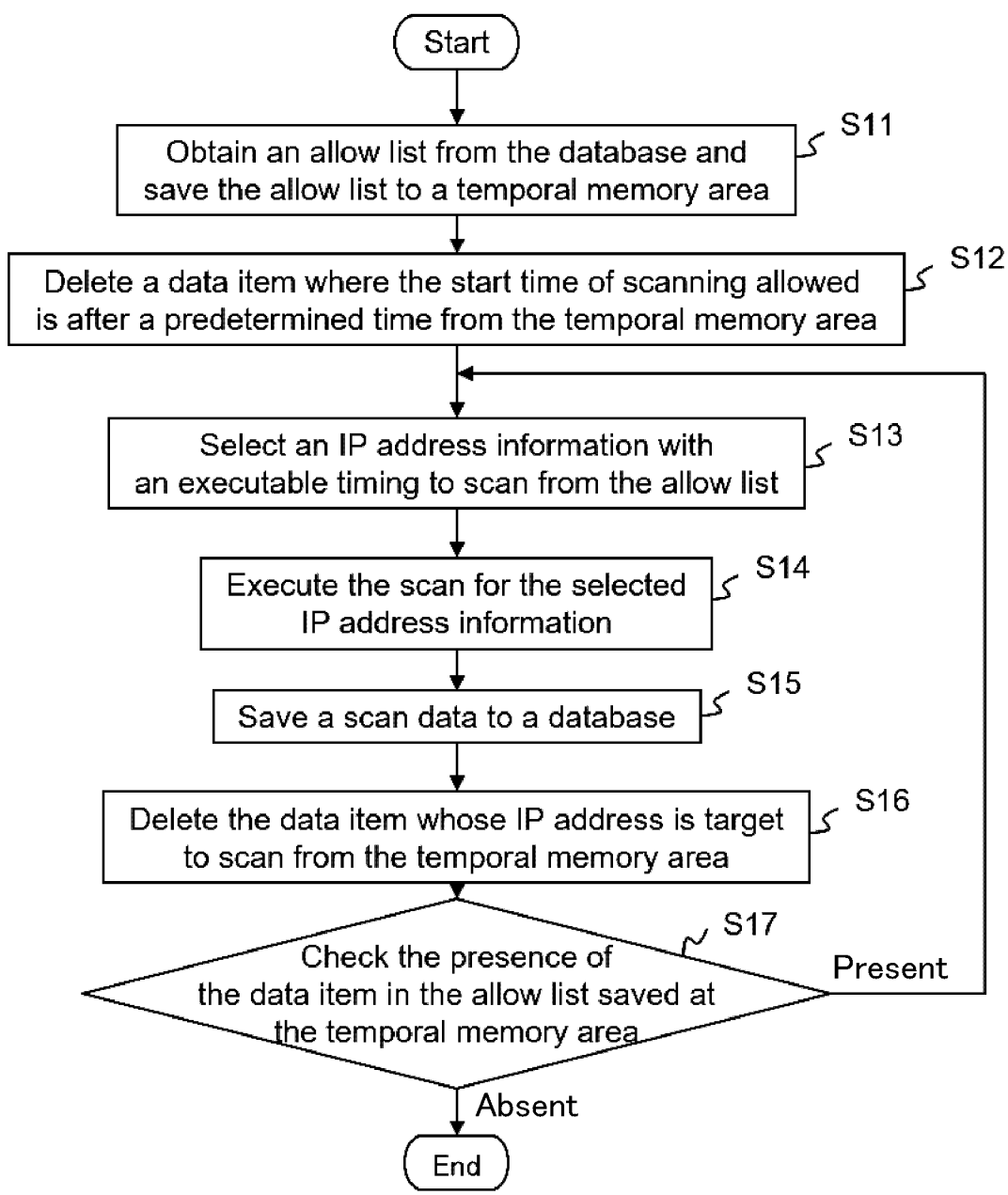
FIG. 4 is a flowchart showing an example of operation in a scanning executing phase of the information collection system 1 according to the first exemplary embodiment.

Next, the operation of the information collection system 1 corresponding to a first exemplary embodiment according to the present disclosure will be explained. The operation of the information collection system 1 is composed of two phases, an allow list generation phase and a scanning execution phase. FIG. 3 is a flowchart showing an example of operation in an allow list generation phase of the information collection system 1. FIG. 4 is a flowchart showing an example of operation in a scanning executing phase of the information collection system 1.

In the information collection system 1, the allow list generation phase and the scanning execution phase may be performed sequentially in an offline mode. The two operations may be performed simultaneously or in parallel in an online mode by handling the two operations independently. For the present embodiment, a control system which is a target for scanning assumes that the behavior of the control system is periodic, for example, daily or the like. Based on the generated allow list, the information collection system 1 enables a scan without impact to the availability of the control system by applying the operation of the present exemplary embodiment for subsequent cycles (for example, the next cycle or later) of the operation of the control system.

The operation of the allow list generation phase of the information collection system 1 will be described with reference to the FIG. 3. The operation of the allow list generation phase shown in FIG. 3 is executed independently for each IP address that should be decided whether or not to scan. When there are multiple IP addresses that should be decided whether or not to scan, the operation shown in FIG. 3 will be performed for each IP address. The case for specifying target machines to scan by a network address which represents a subnet or an IP address range is included in the case that there are multiple IP addresses that should be decided whether or not to scan.

The side-channel information processing unit 11 derives load information relating to an IP address to determine whether or not to scan based on an inputted side-channel data (step S101). The allow list generation unit 12 initializes a time counter that indicates a time of the load information to i=0 (step S102). In addition, the allow list generation unit 12 sets a determination state to "scan impossible" where the determination state is a temporal memory area for determination results of whether or not to scan (step S103).

The allow list generation unit 12 checks whether the load information at a time $t_i$ satisfy a predetermined decision criteria for determining whether to execute scan (step S104). When the decision criteria is satisfied ("Yes" in step S104), the allow list generation unit 12 perform the process of step S105 described below. When the decision criteria is not satisfied ("No" in step S104), the allow list generation unit 12 performs the process of step S109 described below.

The allow list generation unit 12 checks whether the determination state is "scan impossible" or not (step S105). When the determination state is "scan impossible" ("Yes" in step S105), the allow list generation unit 12 changes the determination state to "scan possible" and records the time $t_i$ corresponding to the load information as $t_s$ in a temporal memory area (step S106). When the determination state is not "scan impossible" (thus "scan possible", and "No" in step S105), the allow list generation unit 12 performs the process of step S107 described below.

The allow list generation unit 12 updates the time counter i to i+1 that indicates the time of the load information (step S107). Subsequently, the allow list generation unit 12 checks for the presence of the load information at a time $t_i$ where the time counter is updated (step S108). When there is the load information at the time $t_i$ ("Yes" in step S108), the allow list generation unit 12 performs the step S104 again. When there is no load information at the time $t_i$ ("No" in step S108), the information collection system 1 finishes the operation of the allow list generation phase.

When "No" is selected at conditional branching of step S104, the allow list generation unit 12 checks whether the determination state is "scan possible" or not, where the determination state is a temporal memory area for determination results of whether or not to scan (step S109). When the determination state is not "scan possible" (thus "scan impossible", and "No" in step S109), the allow list generation unit 12 performs step S107 which is the update process for the time counter described above without performing specific process.

When the determination state is "scan possible" ("Yes" in step S109), the allow list generation unit 12 changes the determination state to "scan impossible", and records the time $t_{i-1}$ corresponding to the load information as the in a temporal memory area (step S110).

Next, the allow list generation unit 12 compares the two data items of time information ($t_s$ and $t_e$) recorded in the temporal memory area (step S111). When the two data items of time information ($t_s$ and $t_e$) are the same ("No" in step S111), the allow list generation unit 12 performs step S107 which is the update process for the time counter described above without generating an allow list.

When the two data items of time information ($t_s$ and $t_e$) are different ("Yes" in step S111), the allow list generation unit 12 generates a allow list based on IP address information for target machines to be scanned and the two data items of time information ($t_s$ and $t_e$), and registers the allow list to a database of the allow list storage unit 13 (step S112). The allow list may be row elements in the table format shown in FIG. 2. Subsequently, the allow list generation unit 12 performs step S107 which is the update process for the time counter described above.

Next, the operation of the scanning execution phase of the information collection system 1 will be described with reference to the FIG. 4. The operation of the scanning execution phase shown in FIG. 4 is executed repeatedly with a periodic interval when the purpose of scanning is continuous information collection.

The scan control unit 15 obtains the allow list from the database in the allow list storage unit 13, save the allow list to a temporal memory area in the scan control unit 15 (step S11). The scan control unit 15 deletes a data item which is numbered where the start time of allowed scanning is after a predetermined time from the temporal memory area in the scan control unit 15 (step S12). The predetermined time may be the next timing to execute the scanning execution phase which will be executed repeatedly. For example, the predetermined time is 30 minutes after the current time when the scanning execution phase is executed repeatedly at 30 minute intervals.

The scan control unit 15 selects IP address information with an executable timing to scan from the allow list where the process of above-mentioned step S12 has been performed (step S13). The executable timing may be that the current time is a time from the start time of allowed scanning to the end time of allowed scanning. The IP address information may be the information described in the IP address column in the allow list shown in FIG. 2. The IP address information may be an IP address, a network address that represents a subnet or an IP address range.

Next, the scan processing unit 16 executes the scan based on the IP address information which is selected at abovementioned step S13 (step S14). When the IP address information is an individual IP address, the scan processing unit 16 executes the scan by designating the individual IP address itself. When the IP address information is a network address that represents a subnet or an IP address range, the scan processing unit 16 executes the scan by designating multiple IP addresses including in the network address or the IP address range sequentially.

The scan control unit 15 saves scan data obtained by executing an active scan in the step S14 to the database in the scan result storage unit 14 (step S15). When the scan data of the same IP address has been already saved in the database, the scan result storage unit 14 may be updated to the latest information. In addition, the scan control unit 15 may extracts an asset information from the scan data and may save the asset information to the database. The asset information may be component information and/or configuration information relating to, for example, hardware, software, and firmware incorporated in the component equipment of the target system.

The scan control unit 15 deletes a data item which is numbered where the data item has IP address information to set as a target to scan in the step S14 (the IP address information selected in the step S13) from the temporal memory area in the scan control unit 15 (step S16). The scan control unit 15 checks for the presence of the data item in the allow list, where the data item has IP address information to set as target to scan (step S17). When there is at least one or more data items in the allow list (i.e., "present" at step S17), the scan control unit 15 performs the step S13 again. When there are no data items in the allow list (i.e., "absent" at step S17), the information collection system 1 finishes the operation of the scanning execution phase.

[Effects of the Exemplary Embodiment]

According to the first exemplary embodiment, the information collection system 1 automatically generates an allow list that designates a scan range and a scan timing which have no impact on the availability of the target system by the operation of the allow list generation phase performed at the side-channel information processing unit 11, the allow list generation unit 12, and the allow list storage unit 13. Therefore, the information collection system 1 is able to determine a range to scan and a timing to scan without manual operation. In the generation process of the allow list, the allow list generation unit 12 determines whether or not to affect the availability of the target system by referencing the load information derived from the side-channel data.

According to the first exemplary embodiment, further, the information collection system 1 executes an active scan using the allow list generated in the operation of the allow list generation phase by the operation of the scanning execution phase performed at the allow list storage unit 13, the scan result storage unit 14, the scan control unit 15, and the scan processing unit 16. Therefore, the information collection system 1 is able to execute the active scan with the scan range and the scan timing which have no impact on the availability of the target system. In addition, when the information collection system 1 executes the operation of the scanning execution phase at a fixed time interval based on the periodic polling action for the purpose of the continuous scan, the information collection system 1 is able to execute the active scan at a timing considering the effect to the behavior of the target machine.

As a result, according to the first exemplary embodiment, since the information collection system 1 determines the scan range and the scan timing so as to have no impact on the availability, the information collection system 1 is able to collect the asset information for the security assessment continuously and automatically without impact on the availability of the target machine.

Exemplary Embodiment 2

Figure 5:
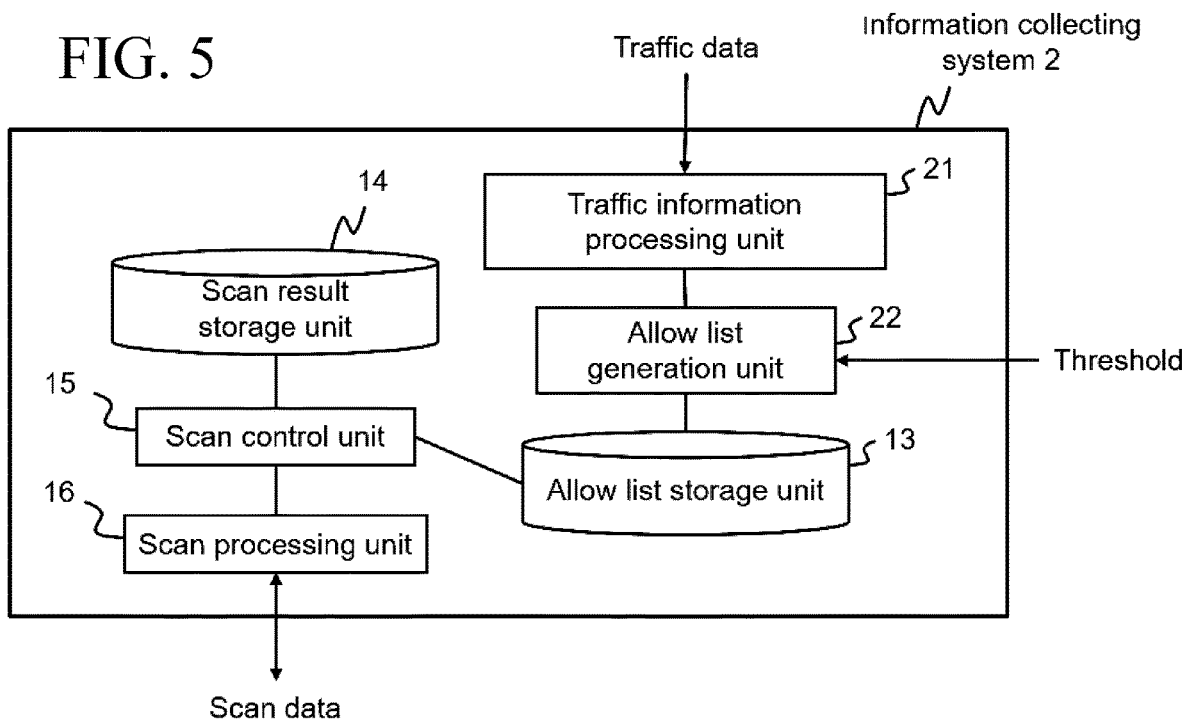
FIG. 5 is a block diagram showing an example of a functional configuration of an information collection system 2 according to a second exemplary embodiment.

According to the present disclosure, a second exemplary embodiment is that the side-channel data in the first exemplary embodiment is replaced with traffic data which a target machine transmits and receives. FIG. 5 is a block diagram showing an example of a functional configuration of an information collection system 2 corresponding to the second exemplary embodiment according to the present disclosure. As shown in FIG. 5, an information collection system 2 includes a traffic information processing unit 21, an allow list generation unit 22, an allow list storage unit 13, a scan result storage unit 14, a scan control unit 15, and a scan processing unit 16. The same reference numbers are used for the elements having the same function as the first exemplary embodiment shown in FIG. 1 and the description of the element is omitted.

The traffic information processing unit 21 receives traffic data as an input from the outside, processes the traffic data to calculate a network load information, and then outputs the network load information to the allow list generation unit 22. The traffic data may be a packet itself which is transmitted and received at a target machine, a header information of the packet, or log information of the packet. The traffic data may be a packet where the source address or the destination address is an IP address associated with the target machine for active scanning.

The network load information may be values represented by bit per second (bps) or packet per second (pps). The network load information may be information calculated from the traffic data relating to and/or transmitted from the IP address associated with the target machine. The network load information may be information calculated by the traffic data received at the IP address associated with the target machine.

The allow list generation unit 22 receives the network load information as an input from the traffic information processing unit 21 and receives a predetermined threshold as an input from the outside. The allow list generation unit 22 determines that an active scan is executable on a machine which has an IP address associated with the network load information when a predetermined condition is satisfied and then generate an allow list where IP address information is written. The allow list generation unit 22 outputs the generated allow list to the allow list storage unit 13.

The predetermined threshold is a parameter which is an input from the outside of the information collection system 2 and is used as a decision criteria to determine whether or not an active scan is executable. The value of the threshold may be determined depending on the operational state of the target machine which is incorporated in the control system, or the asset information of the target machine. The value of the threshold may be given as a fixed parameter in advance or as a changing parameter according to situations. The predetermined condition is that the network load is lower than the threshold.

The IP address information may be an IP address associated with the target machine for active scanning. The IP address information may be a network address that represents a subnet or an IP address range to which an IP address associated with the target machine for active scanning belongs.

Figure 6:
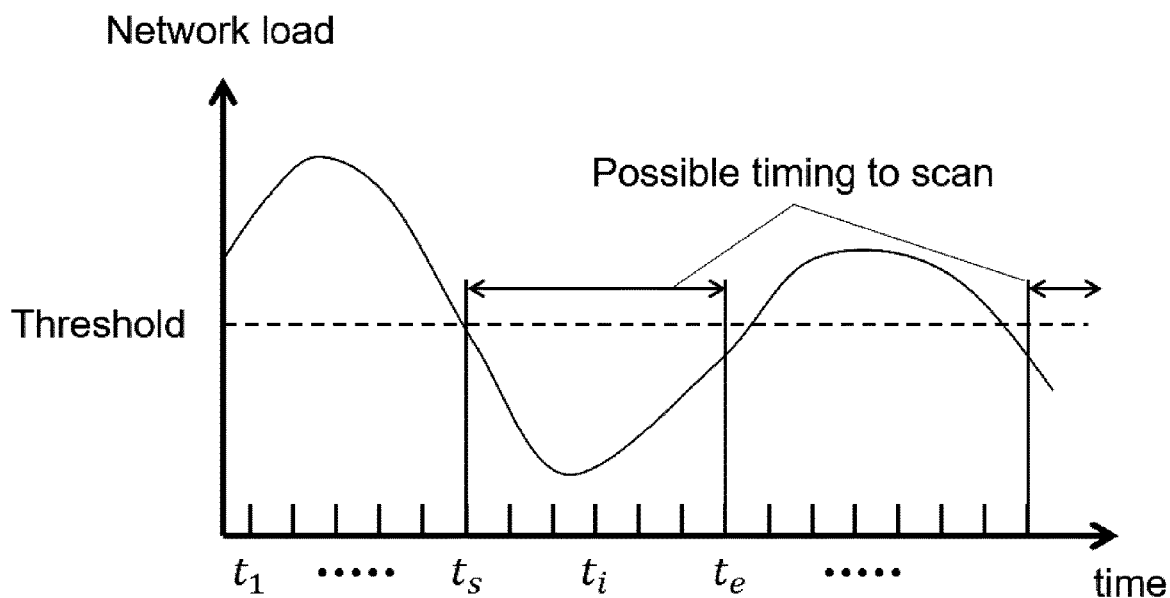
FIG. 6 is an explanatory diagram showing a relationship between a network load information and an allowing threshold which is utilized as a criteria to determine whether to execute scan in an allow list generation unit 22 according to the second exemplary embodiment.

A graph of FIG. 6 shows the network load information fluctuating over time where the horizontal axis represents time and the vertical axis represents the network load. The network load information may be plotted on the graph based on the packets transmitted from and received by the machine. The horizontal axis indicates time, $t_i$ (i=1, . . . , n), at which the value of the network load is referenced. As shown in the graph of FIG. 6, the allow list generation unit 22 may determine that an active scan is executable on a machine which has an IP address associated with the network load information because the network load is lower than the threshold for the duration from the $t_s$ to the time $t_e$. After the time $t_{e+1}$, since the network load is larger than the threshold, the allow list generation unit 22 may determine that an active scan is not executable.

With regard to the allow list storage unit 13, the scan result storage unit 14, the scan control unit 15, and the scan processing unit 16 which are shown in FIG. 5, redundant detailed descriptions thereof are omitted because these elements have same function as those in the first exemplary embodiment shown in FIG. 1.

Next, the operation of the information collection system 2 corresponding to a second exemplary embodiment according to the present disclosure will be explained. The operation of the information collection system 2 is composed of two phases, which is the same as the first exemplary embodiment, i.e., an allow list generation phase and a scan execution phase. The same reference numbers as those shown in the FIG. 3 or 4 are used for the same operation with the first exemplary embodiment and the description of the operation will be omitted. Since the scan execution phase of the second exemplary embodiment is the exact same as the scan execution phase of the first exemplary embodiment shown in FIG. 4, a redundant detailed description thereof will be omitted.

Figure 7:
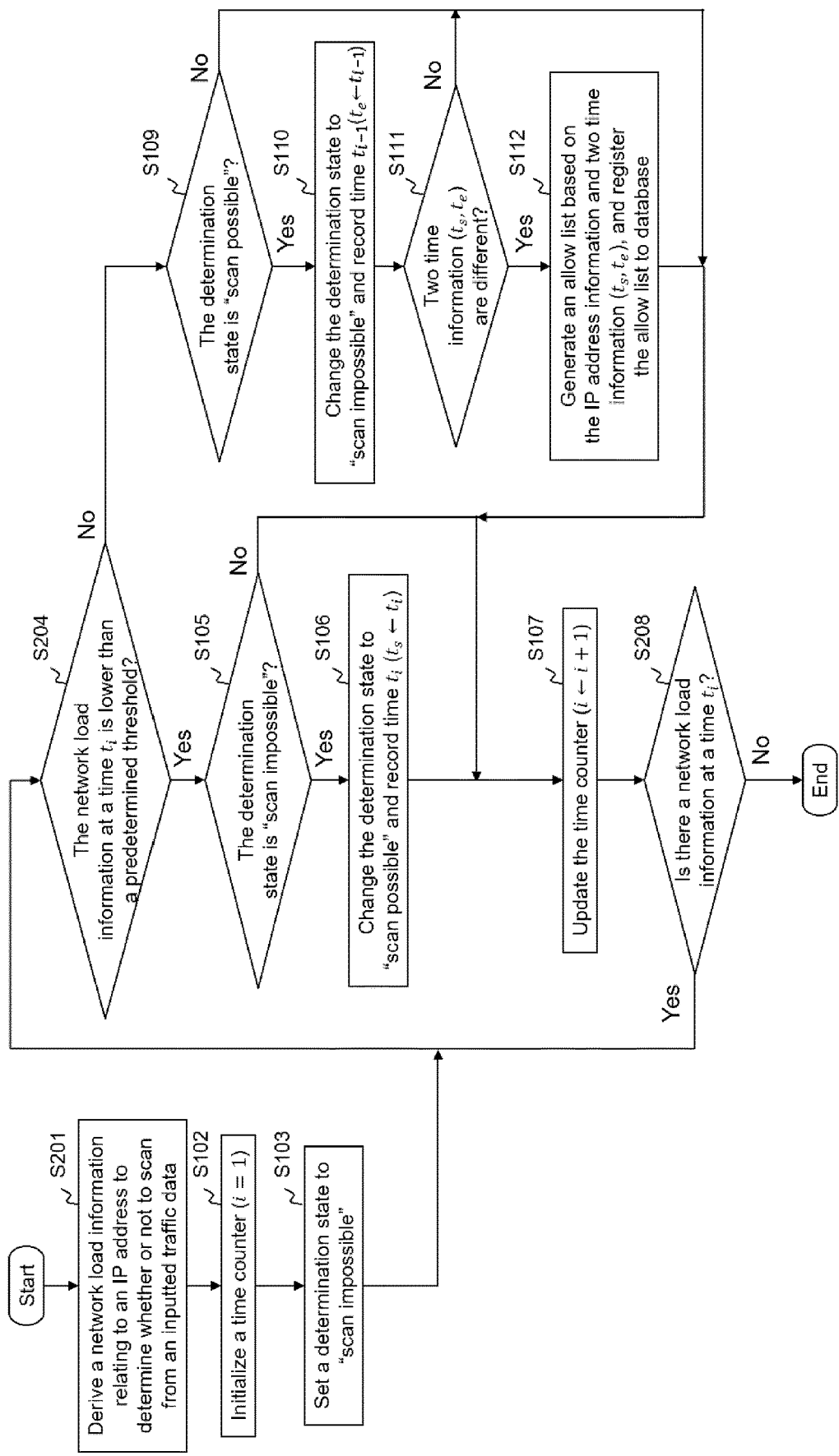
FIG. 7 is a flowchart showing an example of operation in an allow list generation phase of the information collection system 2 according to the second exemplary embodiment.

FIG. 7 is a flowchart that shows the operation of the allow list generation phase for the operation of the information collection system 2. The steps S102 to S103, S105 to S107, and S109 to S112 shown in FIG. 7 are the same as those of the first exemplary embodiment shown in FIG. 3, redundant detailed descriptions thereof will be omitted.

The traffic information processing unit 21 calculates a network load information relating to an IP address to determine whether or not to scan based on an inputted traffic data (step S201).

The allow list generation unit 22 compares the value of the network load information at a time $t_i$ and the threshold which is a decision criteria to determine whether or not to scan, and determine whether the value of the network load information is lower than the threshold or not (step S204). When the value of the network load information is lower than the threshold ("Yes" in step S204), the allow list generation unit 22 perform the process of step S105. When the value of the network load information is equal to or larger than the threshold ("No" in step S204), the allow list generation unit 22 performs the process of step S109.

After updating the time counter i to i+1 at step S107, the allow list generation unit 22 checks for the presence of the network load information at a time $t_i$ where the time counter is updated (step S208). When there is the network load information at the time $t_i$ ("Yes" in step S208), the allow list generation unit 22 perform the step S204 again. When there is no network load information at the time $t_i$ ("No" in step S208), the information collection system 2 finishes the operation of the allow list generation phase.

According to the second exemplary embodiment, since the information collection system 2 allows the traffic information processing unit 21 to process traffic data inputted from the outside and to calculate network load information, and allows the allow list generation unit 22 to refer to the network load information, the information collection system 2 is able to generate an allow list. Therefore, the information collection system 2 is able to specify a scan range and a scan timing which have no impact on the availability of the target system by using the traffic data transmitted from and received by the target machine.

Exemplary Embodiment 3

Figure 8:
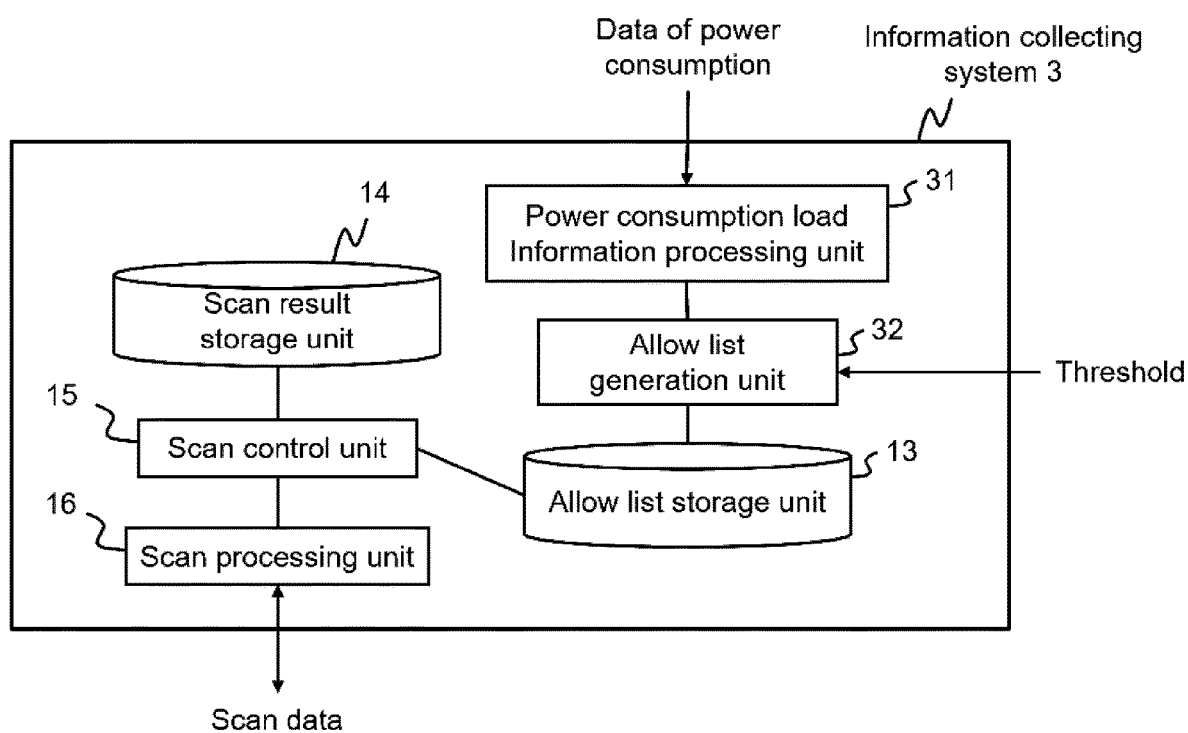
FIG. 8 is a block diagram showing an example of a functional configuration of an information collection system 3 according to a third exemplary embodiment.

According to the present disclosure, a third exemplary embodiment is that the side-channel data in the first exemplary embodiment is replaced with power consumption data in a target machine. FIG. 8 is a block diagram showing an example of a functional configuration of an information collection system 3 corresponding to the third exemplary embodiment according to the present disclosure. As shown in FIG. 8, an information collection system 3 includes a power consumption load information processing unit 31 (power consumption load information processor), an allow list generation unit 32, an allow list storage unit 13, a scan result storage unit 14, a scan control unit 15, a scan processing unit 16. The same reference numbers are used for the elements having the same function as the first exemplary embodiment shown in FIG. 1 and a redundant description of the element is omitted.

The power consumption load information processing unit 31 receives power consumption data as an input from the outside, processes the power consumption data to derive a power consumption load information and then outputs the power consumption load information to the allow list generation unit 32. The power consumption data may be measured values of power consumption in the target machine by using a commercially available measuring instrument or values of power consumption measured by a software-based function or a hardware-based function which is provided by the target machine for active scanning.

The power consumption load information may be values represented in watts (W) in the target machine. The power consumption load information may be physical values relating to power consumption, such as current values represented in amperes (A) or voltage values represented in volts (V). In the third exemplary embodiment, an IP address associated with the target machine may be given in advance. Information corresponding to an IP address associated with the target machine may be saved at a temporal memory area in the allow list generation unit 32.

The allow list generation unit 32 receives the power consumption load information as an input from the power consumption load information processing unit 31, and receives a predetermined threshold as an input from the outside. The allow list generation unit 32 determines that an active scan is executable on a machine associated with the power consumption load information when a predetermined condition is satisfied, and then generate an allow list where IP address information is written. The allow list generation unit 32 outputs the generated allow list to the allow list storage unit 13.

The predetermined threshold is a parameter which is an input from the outside of the information collection system 3 and is used as a decision criteria to determine whether or not an active scan is executable. The value of the threshold may be determined depending on the operational state of the target machine which is incorporated in the control system or the asset information of the target machine. The value of the threshold may be given as a fixed parameter in advance or as a changing parameter according to various situations. The predetermined condition is that the value of the power consumption is lower than the threshold. Generally, when the load of the target machine is high, a high value of power consumption tends to be observed. Conversely, when the load of the target machine is low, a low value of power consumption tends to be observed.

The IP address information may be an IP address associated with the target machine for active scanning. The IP address information may be a network address that represents a subnet or an IP address range where an IP address associated with the target machine for active scanning belongs. In the third exemplary embodiment, the IP address information may be obtained by referencing the corresponding information for IP addresses associated with each target machine which is saved at the temporal memory area in the allow list generation unit 32.

With regard to the allow list storage unit 13, the scan result storage unit 14, the scan control unit 15, and the scan processing unit 16 which are shown in FIG. 8, redundant detailed descriptions thereof are omitted because these elements have the same function as those in the first exemplary embodiment shown in FIG. 1.

Next, the operation of the information collection system 3 corresponding to a third exemplary embodiment according to the present disclosure will be explained. The operation of the information collection system 3 is composed of two phases, which are the same as the first exemplary embodiment, i.e., an allow list generation phase and a scan execution phase. The same reference numbers as those shown in the FIG. 3 or 4 are used for the same operation with the first exemplary embodiment and a redundant description of the operation will be omitted. Since the scan execution phase of the third exemplary embodiment is the exact same as the scan execution phase of the first exemplary embodiment shown in FIG. 4, a redundant detailed description thereof will be omitted.

Figure 9:
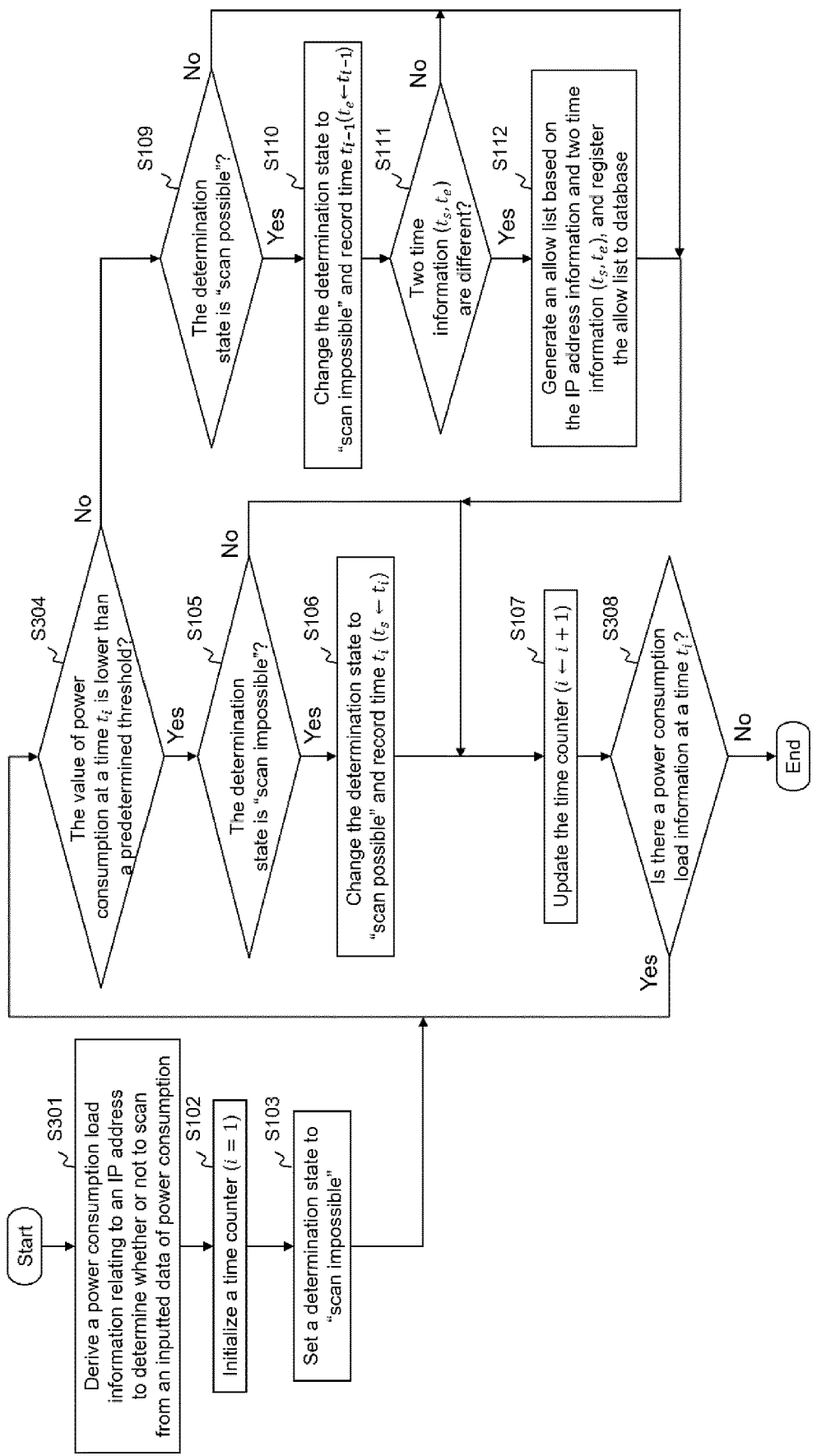
FIG. 9 is a flowchart showing an example of operation in an allow list generation phase of the information collection system 3 according to the third exemplary embodiment.

FIG. 9 is a flowchart that shows the operation of the allow list generation phase for the operation of the information collection system 3. The steps S102 to S103, S105 to S107, and S109 to S112 shown in FIG. 9 are the same as those of the first exemplary embodiment shown in FIG. 3, redundant detailed descriptions thereof will be omitted.

The power consumption load information processing unit 31 derives a power consumption load information relating to an IP address to determine whether or not to scan based on an inputted power consumption data (step S301).

The allow list generation unit 32 compares the value of the power consumption load information at a time $t_i$ and the threshold which is a decision criteria to determine whether or not to scan and determine whether the value of the power consumption load information is lower than the threshold or not (step S304). When the value of the power consumption load information is lower than the threshold ("Yes" in step S304), the allow list generation unit 32 performs the process of step S105. When the value of the power consumption load information is equal to or larger than the threshold ("No" in step S304), the allow list generation unit 32 performs the process of step S109.

After updating the time counter i to i+1 at step S107, the allow list generation unit 32 checks for the presence of the power consumption load information at a time $t_i$ where the time counter is updated (step S308). When there is the power consumption load information at the time $t_i$ ("Yes" in step S308), the allow list generation unit 32 performs the step S304 again. When there is no power consumption load information at the time $t_i$ ("No" in step S308), the information collection system 3 finishes the operation of the allow list generation phase.

According to the third exemplary embodiment, since the information collection system 3 allows the power consumption load information processing unit 31 to process power consumption data inputted from the outside and to derives a power consumption load information and allows the allow list generation unit 32 to refer to the power consumption load information, the information collection system 3 is able to generate an allow list. Therefore, the information collection system 3 is able to specify a scan range and a scan timing which have no impact on the availability of the target system by using the power consumption data in the target machine.

Exemplary Embodiment 4

Figure 10:
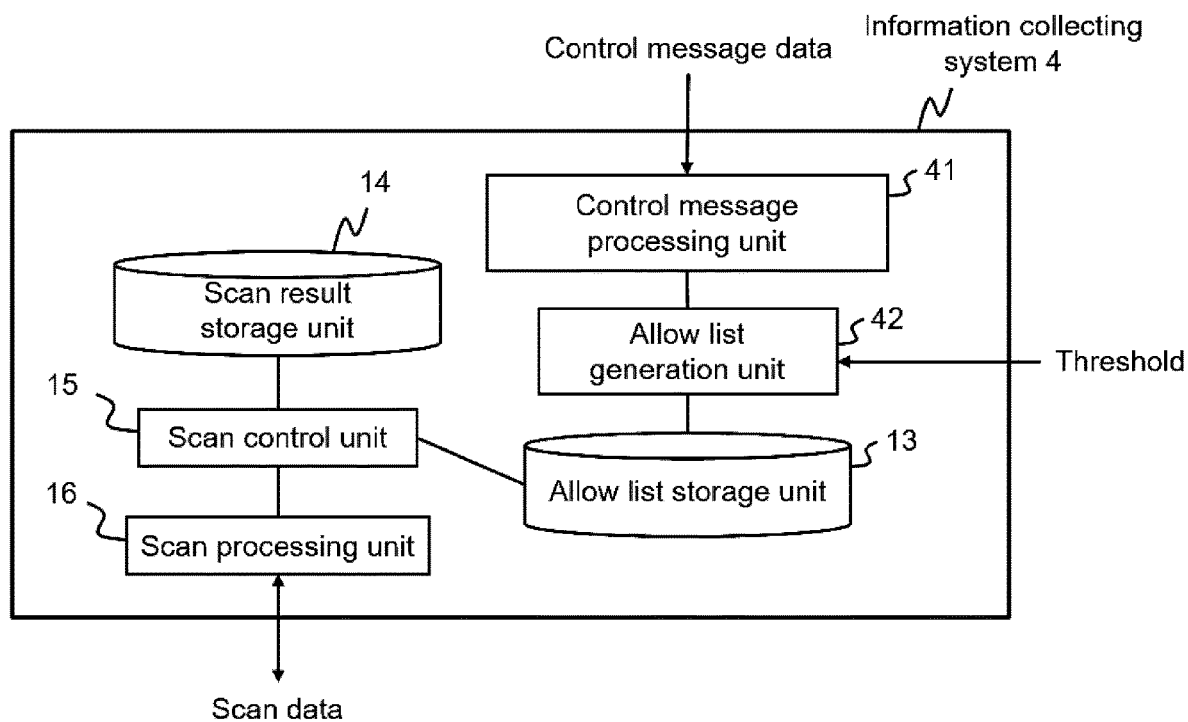
FIG. 10 is a block diagram showing an example of a functional configuration of an information collection system 4 according to a forth exemplary embodiment.

According to the present disclosure, a forth exemplary embodiment is that the side-channel data in the first exemplary embodiment is replaced with a control message included in a packet which a target machine transmits and receives. The control message may be a control command or a control data which a machine incorporated in the control system transmits or receives. FIG. 10 is a block diagram showing an example of a functional configuration of an information collection system 4 corresponding to the forth exemplary embodiment according to the present disclosure. As shown in FIG. 10, an information collection system 4 includes a control message processing unit 41 (control message processor), an allow list generation unit 42, an allow list storage unit 13, a scan result storage unit 14, a scan control unit 15, a scan processing unit 16. The same reference numbers are used for the elements having the same function as the first exemplary embodiment shown in FIG. 1 and the description of the element is omitted.

The control message processing unit 41 receives a control message data as an input from the outside, processes the control message data to extract an operating information relating to a target machine and then outputs the operating information to the allow list generation unit 42. The control message data may be data which machines in the control systems transmit to and receive from each other. An IP address associated with the target machine may be given in advance, or may be obtained by referencing the information described in the control message.

The control message data may include a control command to control machines in the control system. The control message data may include a control command that includes an instruction to start an operation of the machine corresponding to the destination of the message such as "ON", "START", and the like. The control message data may include a control command that includes an instruction to terminate an operation of a machine corresponding to the destination of the message such as "STOP", "OFF", "END", and the like. The control message data may include a control command that includes an instruction to make a standby state of the machine corresponding to the destination of the message such as "IDLE", "UNUSED", "STANDBY", and the like.

The control message data may include a control data to show an operational state of a machine. The control message data may include control data that represents a high load of an operating machine such as "ALARM", "EMERGENCY", "OPERATED", and the like. The control message data may include a control data that represents a standby state of an operating machine such as "IDLE", "UNUSED", "STANDBY", and the like. The control message data may include a control data which is a sensor value to stand for an operational state of a machine. The sensor value may include a physical value to represent temperature or pressure.

Figure 11:
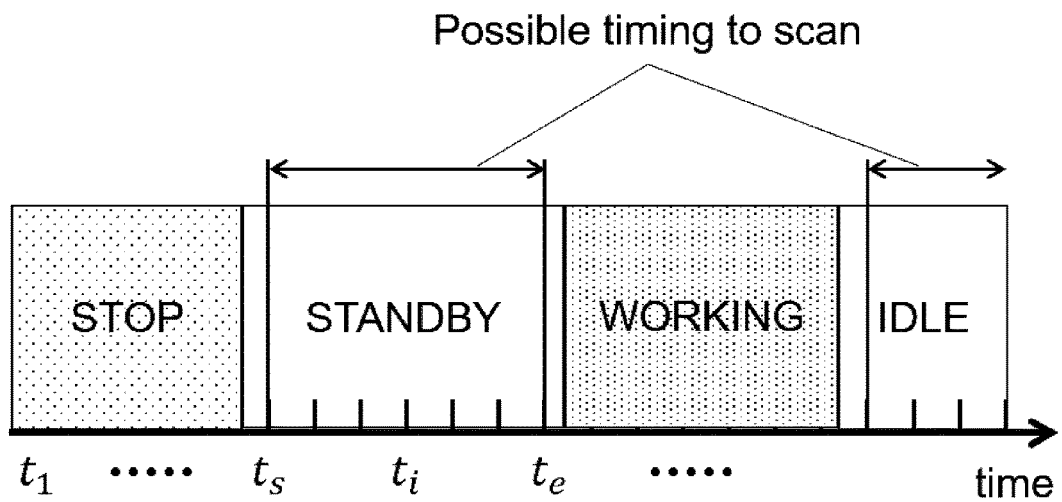
FIG. 11 is an explanatory diagram showing an example of operating information which is utilized as a criteria to determine whether to execute scan in an allow list generation unit 42 according to the forth exemplary embodiment.

The operating information is the information to represent transition of operational states of a machine that change over time. The operational state may include "WORKING", "STANDBY STATE", "SUSPENDED STATE", and the like. Each operational state having the operating information can be specified by referencing the contents described in the control message data such as "ON", "OFF", "IDLE", and the like. FIG. 11 is an example chart to show the transition of operational states, which is the operating information. An operational state at a time is plotted on the time axis by referencing the contents described in the control message data.

The allow list generation unit 42 receives the operating information as an input from the control message processing unit 41. The allow list generation unit 42 determines that an active scan is executable on a machine which has an IP address associated with the operating information when a predetermined condition is satisfied, and then generate an allow list where IP address information is written. The allow list generation unit 42 outputs the generated allow list to the allow list storage unit 13.

The predetermined condition may be that the operational state of the operating information matches an operational state where an active scan is executable. The predetermined condition may be satisfied when the content described in the control message data represents the standby state of the target machine or for the low load state of the target machine. On the other hand, when the content described in the control message data represents the working state of the target machine or for the high load state of the target machine, the predetermined condition may not be satisfied.

As shown in FIG. 11, times $t_i$ (i=1, . . . , n) are indicated on the horizontal axis for the operating information. The allow list generation unit 42 may determine that an active scan is executable on a machine which has the IP address above-mentioned because the operating information is "STANDBY" for the duration from the time $t_s$ to the time $t_e$. The allow list generation unit 42 determine that an active scan is not executable because the operating information is "WORKING" after the time $t_{e+1}$ shown in the FIG. 11.

The IP address information may be an IP address associated with the target machine for active scanning. The IP address information may be a network address that represents a subnet or an IP address range where an IP address associated with the target machine for active scanning belongs. In the information collection system 4, the IP address information may be saved at the temporal memory area in the allow list generation unit 42. When IP address information can be extracted from the control message data, the allow list generation unit 42 may receive the IP address information with the operating information from the control message processing unit 41, and use the IP address information.

The allow list storage unit 13, the scan result storage unit 14, the scan control unit 15, and the scan processing unit 16 which are shown in FIG. 10, redundant detailed descriptions thereof are omitted because these elements have same function as the first exemplary embodiment shown in FIG. 1.

Next, the operation of the information collection system 4 corresponding to a forth exemplary embodiment according to the present disclosure will be explained. The operation of the information collection system 4 is composed of two phases, which is same as the first exemplary embodiment, i.e., an allow list generation phase and a scan execution phase. The same reference numbers as those shown in the FIG. 3 or 4 are used for the same operation with the first exemplary embodiment and the description of the operation will be omitted. Since the scan execution phase of the forth exemplary embodiment is the exact same with the scan execution phase of the first exemplary embodiment shown in FIG. 4, a redundant detailed description thereof will be omitted.

Figure 12:
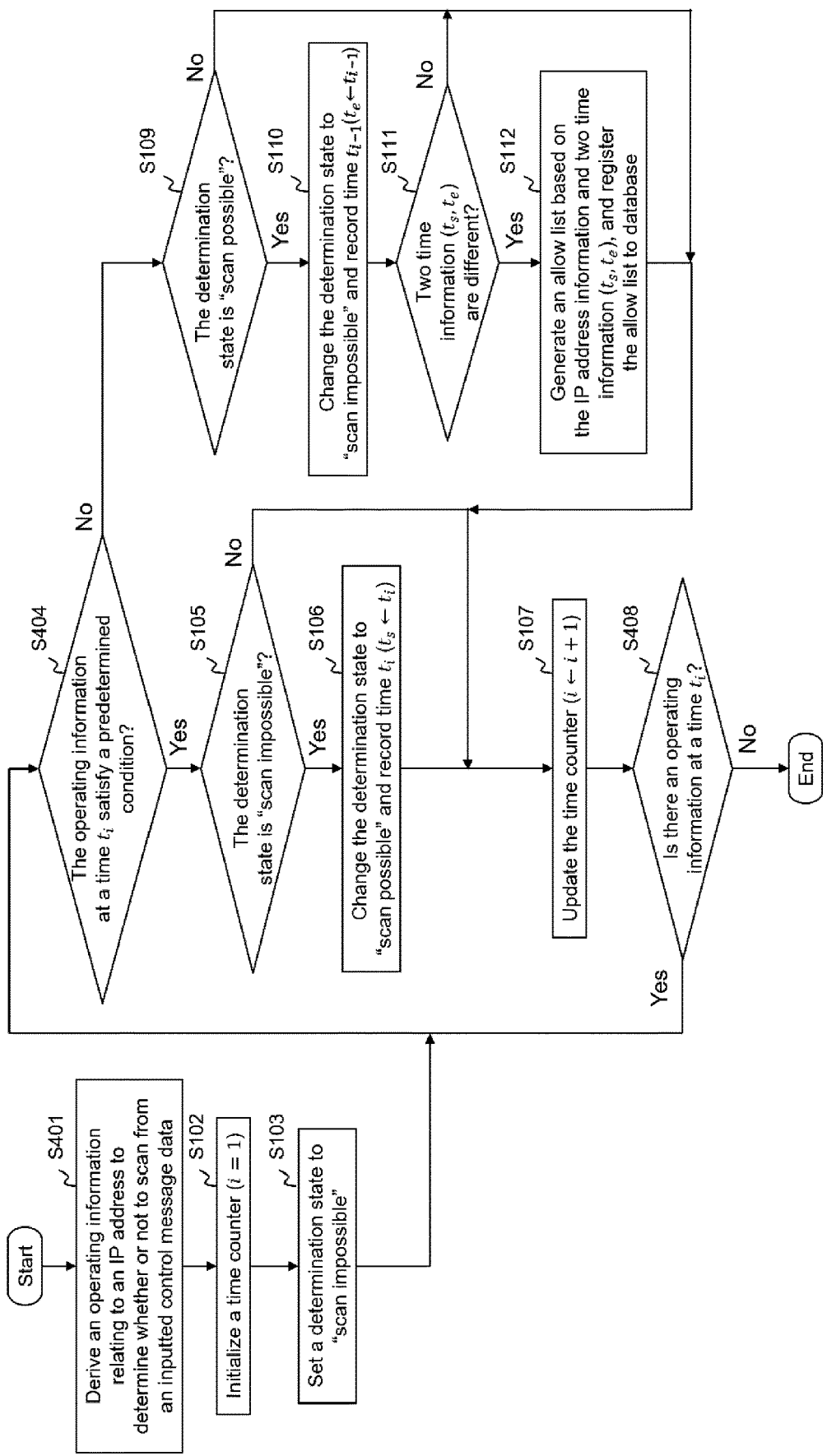
FIG. 12 is a flowchart showing an example of operation in an allow list generation phase of the information collection system 4 according to the forth exemplary embodiment.

FIG. 12 is a flowchart that shows the operation of the allow list generation phase for the operation of the information collection system 4. The steps S102 to S103, S105 to S107, and S109 to S112 shown in FIG. 12 are the same as those of the first exemplary embodiment shown in FIG. 3, redundant detailed descriptions thereof will be omitted.

The control message processing unit 41 extracts an operating information relating to an IP address to determine whether or not to scan based on an inputted control message data (step S401).

The allow list generation unit 42 checks whether the operational state at a time $t_i$ of operating information satisfies a decision criteria (step S404). The decision criteria may be that the operational state matches an operational state where an active scan is executable. The decision criteria may be that the operational state matches the standby state or the low load state where an active scan is executable. In addition, the decision criteria may be that the operational state does not match the working state or the high load state where an active scan is impossible.

When the decision criteria is satisfied ("Yes" in step S404), the allow list generation unit 42 perform the process of step S105. When the decision criteria is not satisfied ("No" in step S404), the allow list generation unit 42 performs the process of step S109.

After updating the time counter i to i+1 at step S107, the allow list generation unit 42 checks for the presence of the operating information at a time $t_i$ where the time counter is updated (step S408). When there is the operating information at the time $t_i$ ("Yes" in step S408), the allow list generation unit 42 perform the step S404 again. When there is no operating information at the time $t_i$ ("No" in step S408), the information collection system 4 finishes the operation of the allow list generation phase.

According to the forth exemplary embodiment, since the information collection system 4 let the control message processing unit 41 to process control message data inputted from the outside and to derives an operating information and allows the allow list generation unit 42 to refer to the operating information, the information collection system 4 is able to generate an allow list. Therefore, the information collection system 4 is able to specify a scan range and a scan timing which have no impact on the availability of the target system by determining whether or not to scan based on the operational state described in the control message data.

Exemplary Embodiment 5

Figure 13:
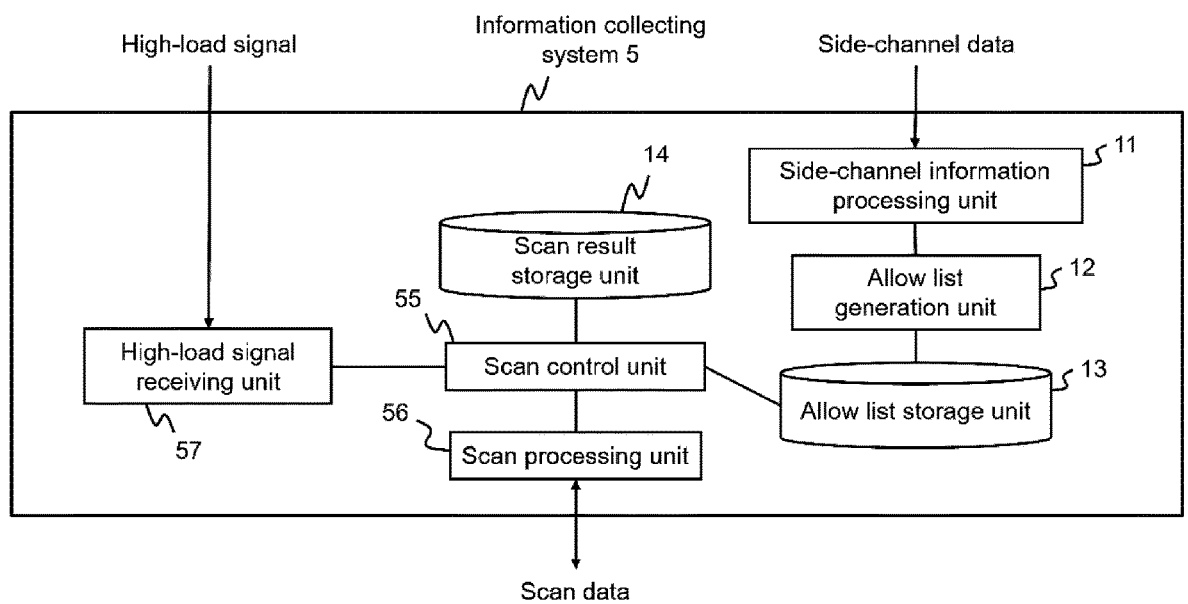
FIG. 13 is a block diagram showing an example of a functional configuration of an information collection system 5 according to a fifth exemplary embodiment.

According to the present disclosure, a fifth exemplary embodiment has a function to stop the scan activity which is plan to execute or which is running when a predetermined high-load signal is inputted in the scanning execution phase of the first exemplary embodiment. FIG. 13 is a block diagram showing an example of a functional configuration of an information collection system 5 corresponding to the fifth exemplary embodiment according to the present disclosure. As shown in FIG. 13, an information collection system 5 includes a side-channel information processing unit 11, an allow list generation unit 12, an allow list storage unit 13, a scan result storage unit 14, a scan control unit 55, a scan processing unit 56, and a high-load signal receiving unit 57 (high-load signal receiver). The same reference numbers are used for the elements having the same function as the first exemplary embodiment shown in FIG. 1 and a redundant description of the element is omitted.

The scan control unit 55 requests the allow list storage unit 13 to output an allow list, and receives the allow list retrieved by the allow list storage unit 13. The scan control unit 55 may receive all data items recorded in the allow list, or a subset of data items recorded in the allow list. For example, when the items described at the column of IP address as shown in FIG. 2 are specified by the scan control unit 55 in requesting the output of the allow list, the allow list storage unit 13 may output only the related data items to the scan control unit 55.

The scan control unit 55 refers to the allow list received from the allow list storage unit 13, and determines IP address information for scan target and a scan timing according to the IP address information and the information of possible time to scan described in the allow list. The scan timing may be the time from the start time of allowed scanning to the end time of allowed scanning written in the allow list. Moreover, the scan control unit 55 may determine frequency of speed to execute active scans based on the information of the start time of allowed scanning and the end time of allowed scanning written in the allow list.

The scan control unit 55 sends a scan execution request to the scan processing unit 56 at the scan timing when the scan timing is determined. The scan control unit 55 may send IP address information combined with the scan execution request to the scan processing unit 56. The IP address information may be the information described in the IP address column in the allow list shown in FIG. 2. The IP address information may be an IP address, a network address that represents a subnet, or an IP address range.

The scan control unit 55 saves the time of receiving a high-load signal and the machine which sent the high-load signal's IP address to a temporal memory area in the scan control unit 55 in response to the high-load signal received from the high-load signal receiving unit 57. In addition, the scan control unit 55 calculates the time difference between the current time and the time of receiving the high-load signal saved in the temporal memory area and determines to stop the active scan when the time difference is less than a predetermined threshold, and when the machine which sent the high-load signal's IP address is included in the IP address information of the scan target.

The scan control unit 55 immediately sends a scan stopping request to the scan processing unit 56 when the scan control unit 55 determines to stop the active scan. The scan control unit 55 interprets the machine's IP address of sending the high-load signal as a stopping target's IP address. The scan control unit 55 may send the stopping target's IP address to the scan processing unit 56 with the scan stopping request.

The scan control unit 55 may receive a scan data obtained by executing an active scan as an input data from the scan processing unit 56 and may output the scan data to the scan result storage unit 14. The scan control unit 55 may receive asset information extracted from the scan data as an input data from the scan processing unit 56 and may output the asset information to the scan result storage unit 14. The asset information may be component information and configuration information relating to hardware, software, and firmware incorporated in the component equipment of the target system.

The scan processing unit 56 may execute an active scan in response to the scan execution request received from the scan control unit 55. The scan processing unit 56 may execute an active scan to a target machine associated with an IP address according to the IP address information attached with a scan execution request in response to the scan execution request received from the scan control unit 55. The scan processing unit 56 may send a scan packet whose destination address is set as an IP address attached with a scan execution request in response to the scan execution request received from the scan control unit 55.

The scan processing unit 56 may stop an active scan in response to the scan stopping request received from the scan control unit 55. The scan processing unit 56 may stop an active scan to a target machine associated with an IP address according to the IP address information attached with a scan stopping request in response to the scan stopping request received from the scan control unit 55. The scan processing unit 56 may stop to send a scan packet whose destination address is equal to an IP address attached with a scan stopping request in response to the scan stopping request received from the scan control unit 55.

The scan processing unit 56 receives a scan data generated by executing the active scan as an input data from the outside of the information collection system 5 and outputs the scan data to the scan control unit 55. In addition, the scan processing unit 56 may extract asset information from the scan data received as an input and may output the asset information to the scan control unit 55. The asset information may be component information and configuration information relating to hardware, software, and firmware incorporated in the component equipment of the target system. On the other hand, the scan control unit 55 instead of the scan processing unit 56 may extract the asset information.

The high-load signal receiving unit 57 receives a high-load signal as an input from the outside, processes the high-load signal to extract the time of receiving the high-load signal and the machine which sent the high-load signal's IP address and outputs them to the scan control unit 55. The high-load signal may be a message or a value which represent the high-load state of the network load of the target machine and may be a message or a value to represent that the target machine's energy consumption is high. The high-load signal may be control message data that represents a high-load state, for example, "ALARM" or "EMERGENCY".

Next, the operation of the information collection system 5 corresponding to a fifth exemplary embodiment according to the present disclosure will be explained. The operation of the information collection system 5 is composed of two phases, which is same as the first exemplary embodiment, i.e., an allow list generation phase and a scan execution phase. The same reference numbers as those shown in the FIG. 3 or 4 are used for the same operation with the first exemplary embodiment and the description of the operation will be omitted. Since the allow list generation phase of the fifth exemplary embodiment is the exact same as the allow list generation phase of the first exemplary embodiment shown in FIG. 3, a redundant detailed description thereof will be omitted.

Figure 14:
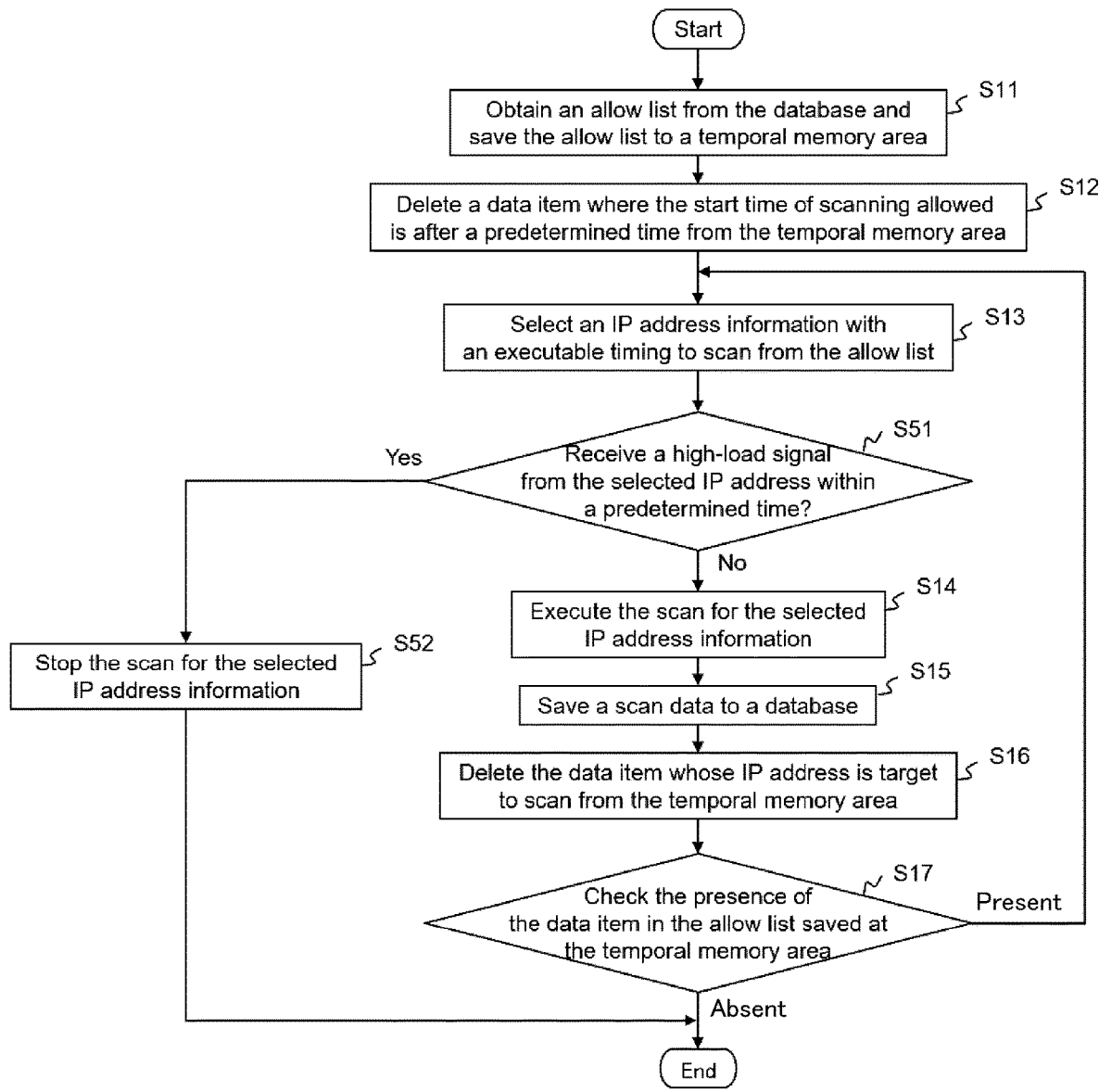
FIG. 14 is a flowchart showing an example of operation in a scanning executing phase of the information collection system 5 according to the fifth exemplary embodiment.

FIG. 14 is a flowchart that shows the operation of the scan execution phase for the operation of the information collection system 5. The steps S11 to S17 shown in FIG. 14 are the same as those of the first exemplary embodiment shown in FIG. 4, redundant detailed descriptions will be omitted.

The scan control unit 55 checks whether or not to receive a high-load signal within a predetermined time from the machine whose IP address is selected as a scan target (step S51). When it is confirmed that the scan control unit 55 receives the high-load signal relating to the IP address ("Yes" in step S51), the scan control unit 55 stops the active scan to the IP address (step S52). When it is not confirmed that the scan control unit 55 receives the high-load signal relating to the IP address ("No" in step S51), the step S14 is performed.

According to the fifth exemplary embodiment, since the information collection system 5 allows the high-load signal receiving unit 57 to process the high-load signal inputted from the outside and to derive the time of receiving the high-load signal and the machine which sent the high-load signal's IP address and allows the scan control unit 55 to send a scan stopping request based on the time information and the IP address information, the information collection system 5 is able to stop an active scan when the target machine is high-load state resulted from abnormal behaviors in the possible time to scan described in the allow list. By monitoring real time behaviors, the information collection system 5 is able to avoid executing an active scan under the unexpected high-load state, which leads to improvement of availability or stability for control systems during the active scan.

Embodiments in accordance with the present embodiments may be implemented as a device, a method, or a computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "system." Furthermore, the present embodiments may take the form of a computer program product embodied in any tangible medium of expression having non-transitory computer-usable program code embodied in the medium. The term "unit" should be interpreted to mean a software module for performing a particular function or a dedicated hardware implemented portion for performing a particular function.

The above-mentioned device may have a computer, micro-controller, programmable logic chip, or other processor known to those of skill in the art that is internal thereto. Additionally, the steps in the processes of the above-mentioned information collection device are stored, in the form of a program, in a non-transitory computer-readable recording medium, and the above-mentioned processes are performed by the computer reading and executing the program. In this case, a non-transitory computer-readable recording medium refers to a magnetic disc, a magneto-optic disc, a CD-ROM, a DVD-ROM, a semiconductor memory device, or the like. Additionally, the computer program may be transmitted to the computer over a communication line, and the computer may execute the program upon receiving this transmission.

The above-mentioned program may be for partially carrying out the above-mentioned functions. The above-mentioned program may be a so-called difference file (difference program) that is combined with a program that is already recorded in the computer system in order to carry out the above-mentioned functions.

All or some of the functions of the above-mentioned information collection device may be carried out by utilizing hardware such as an ASIC (Application Specific Integrated Circuit), a PLD (Programmable Logic Device), an FPGA (Field-Programmable Gate Array) or the like.

In addition thereto, the features in the above-mentioned exemplary embodiments may be appropriately replaced with well-known features, within a range not departing from the scope of the present invention. Additionally, the technical scope of the invention is not limited to the above-mentioned exemplary embodiments, and various modifications may be made within a range not departing from the scope of the present invention.

In addition, the present invention may take a multitude of different forms such as the following notes 1 to 13, but is not to be considered as being limited thereto.

[Supplementary Notes]

[Supplementary Note 1]

An Information Collection System Comprising:
- a side-channel information processing unit that derives load information to estimate an impact on the availability of a target machine for active scanning by using side-channel data;
- an allow list generation unit that generates an allow list including a scan timing and a scan range in which the availability is not affected, the allow list generation unit generating the allow list based on the load information; and
- an allow list storage unit that stores the allow list,
- wherein an active scan of the target machine is executed by referencing the allow list stored in the allow list storage unit to collect asset information of the target machine.

[Supplementary Note 2]

The information collection system according to Supplementary note 1, wherein
- the scan range is determined by IP address information, and
- the IP address information is at least one of: an IP address of the target machine: a network address that represents a subnet to which the IP address of the target machine belongs; and an IP address range including the IP address of the target machine.

[Supplementary Note 3]

The information collection system according to Supplementary note 1 or 2, wherein the allow list generation unit is configured to determine the scan timing by obtaining a start time of allowed scanning and an end time of allowed scanning as time information which is based on the load information and to generate the allow list including the time information when the start time of allowed scanning and the end time of allowed scanning are different from each other.

[Supplementary Note 4]

The information collection system according to any one of Supplementary notes 1 to 3, wherein the allow list storage unit further includes a database to store the allow list connecting the start time of allowed scanning and the end time of allowed scanning with each other for the data items in the allow list.

[Supplementary Note 5]

The information collection system according to any one of Supplementary notes 1 to 4, further comprising:
- a scan control unit configured to obtain the allow list from the allow list storage unit and send a scan execution request; and
- a scan processing unit that executes the active scan in response to receiving the scan execution request,
- wherein the scan control unit determines a timing to send the scan execution request based on the start time of allowed scanning and the end time of allowed scanning in the allow list.

[Supplementary Note 6]

The information collection system according to any one of Supplementary notes 1 to 5, further comprising:
- a traffic information processing unit that calculates network load information by processing the side-channel data,
- wherein the allow list generation unit generates the allow list including the scan timing and the scan range by referencing the network load information,
- wherein the side-channel data is traffic data, and
- wherein the allow list generation unit determines that the active scan is executable on the target machine when the network load information is lower than a threshold.

[Supplementary Note 7]

The information collection system according to any one of Supplementary notes 1 to 5, further comprising:
- a power consumption load information processing unit that derives power consumption load information by processing the side-channel data;
- wherein the side-channel data is power consumption data,
- wherein the allow list generation unit that generates the allow list including the scan timing and the scan range by referencing the power consumption load information,
- wherein the allow list generation unit determines that the active scan is executable on the target machine when the power consumption load information is lower than a threshold.

[Supplementary Note 8]

The information collection system according to any one of Supplementary notes 1 to 5, further comprising:
- a control message processing unit that extracts an operating information by processing the control message data,
- wherein the allow list generation unit generates the allow list including the scan timing and the scan range by referencing the side-channel data,
- wherein the side-channel data is control message data, and
- wherein the allow list generation unit determines that the active scan is executable on the target machine when an operational state of the operating information matches a standby state or a low load state.

[Supplementary Note 9]

The information collection system according to any one of Supplementary notes 5 to 8, further comprising:
- a high-load signal receiving unit that extracts the time information and the IP address information of the target machine that sends a high-load signal; and
- a scan control unit configured to stop sending the scan execution request in response to receiving the high-load signal,
- wherein the scan control unit determines to stop sending the scan execution request prior to the timing that the active scan is executable based on the start time of allowed scanning and the end time of allowed scanning in the allow list, when a time difference between a current time and the time of receiving the high-load signal is lower than a threshold.

[Supplementary Note 10]

The information collection system according to any one of Supplementary notes 5 to 9, further comprising:
- a scan control unit configured to send a scan stopping request in response to receiving the high-load signal; and
- a scan processing unit that stops the active scan of the target machine associated with the IP address information attached with the scan stopping request;
- wherein the scan control unit determines to send the scan stopping request when a current time is equal to the time between the start time of allowed scanning and the end time of allowed scanning which are described in the allow list.

[Supplementary Note 11]
A computer-implemented information collection method comprising:
deriving load information to estimate an impact on the availability of a target machine for active scanning by using side-channel data;
generating an allow list including a scan timing and a scan range in which the availability is not affected, the allow list being based on the load information; and
storing the allow list in memory,
wherein an active scan of the target machine is executed by referencing the allow list stored in memory to collect asset information of the target machine.

[Supplementary Note 12]
A program that causes a computer to execute the steps of:
deriving load information to estimate an impact on the availability of a target machine for active scanning by using side-channel data;
generating an allow list including a scan timing and a scan range in which the availability is not affected, the allow list being based on the load information; and
storing the allow list in memory,
wherein an active scan of the target machine is executed by referencing the allow list stored in memory to collect asset information of the target machine.

[Supplementary Note 13]
A non-transitory computer-readable storage medium storing a program that causes a computer to execute the steps of:
deriving load information to estimate an impact on the availability of a target machine for active scanning by using side-channel data;
generating an allow list including a scan timing and a scan range in which the availability is not affected, the allow list being based on the load information; and
storing the allow list in memory,
wherein an active scan of the target machine is executed by referencing the allow list stored in memory to collect asset information of the target machine.

INDUSTRIAL APPLICABILITY

The present disclosure is applicable to a security assessment system which is mainly utilized in the control systems for critical infrastructures where the top priority is to maintain the system availability, which means stable operation without stopping.

REFERENCE SIGNS LIST

1 Information collection system
2 Information collection system
3 Information collection system
4 Information collection system
5 Information collection system
11 Side-channel information processing unit
12 Allow list generation unit
13 Allow list storage unit
14 Scan result storage unit
15 Scan control unit
16 Scan processing unit
21 Traffic information processing unit
22 Allow list generation unit
31 Power consumption load information processing unit
32 Allow list generation unit
41 Control message processing unit
42 Allow list generation unit
55 Scan control unit
56 Scan processing unit
57 High-load signal receiving unit

The invention claimed is:

1. An information collection system comprising:
at least one processor configured to execute instructions to:
derive load information to estimate an impact on the availability of a target machine for active scanning by using side-channel data;
generate, based on the load information, an allow list including a scan timing and a scan range in which the availability is not affected; and
memory that stores the allow list,
wherein an active scan of the target machine is executed by referencing the allow list stored in the memory to collect asset information of the target machine,
wherein the load information comprises energy load information,
wherein the side-channel data is power consumption data,
wherein deriving load information comprises deriving the energy load information by processing the power consumption data,
wherein generating the allow list comprises generating the allow list including the scan timing and the scan range by referencing the energy load information, and
wherein the at least one processor is configured to execute the instructions to determine that the active scan is executable on the target machine when the energy load information is lower than a threshold.

2. The information collection system according to claim 1, wherein
the scan range is determined by IP address information, and
the IP address information is at least one of: an IP address of the target machine; a network address that represents a subnet to which the IP address of the target machine belongs; and an IP address range including the IP address of the target machine.

3. The information collection system according to claim 1, wherein to generate comprises determining the scan timing by obtaining a start time of allowed scanning and an end time of allowed scanning as time information which is based on the load information and generating the allow list including the time information when the start time of allowed scanning and the end time of allowed scanning are different from each other.

4. The information collection system according to claim 3, wherein the memory further includes a database to store the allow list connecting the start time of allowed scanning and the end time of allowed scanning with each other for data items in the allow list.

5. The information collection system according to claim 3, wherein the at least one processor is configured to execute the instructions to:
obtain the allow list from the memory and send a scan execution request;
execute the active scan in response to receiving the scan execution request; and
determine a timing to send the scan execution request based on the start time of allowed scanning and the end time of allowed scanning in the allow list.

6. The information collection system according to claim 5,
wherein the at least one processor is configured to execute the instructions to:
extract the time information and an IP address information of the target machine that sends a high-load signal; and
stop sending the scan execution request in response to receiving the high-load signal,
wherein to stop comprises stopping the scan execution request prior to the timing that the active scan is executable based on the start time of allowed scanning and the end time of allowed scanning in the allow list, when a time difference between a current time and the time of receiving the high-load signal is lower than a threshold.

7. The information collection system according to claim 5,
wherein the at least one processor is configured to execute the instructions to:
send a scan stopping request in response to receiving a high-load signal;
stop the active scan of the target machine associated with an IP address information attached with the scan stopping request; and
determine to send the scan stopping request when a current time is equal to the time between the start time of allowed scanning and the end time of allowed scanning which are described in the allow list.

8. A computer-implemented information collection method comprising:
deriving load information to estimate an impact on the availability of a target machine for active scanning by using side-channel data;
generating an allow list including a scan timing and a scan range in which the availability is not affected, the allow list being based on the load information; and
storing the allow list in memory,
wherein an active scan of the target machine is executed by referencing the allow list stored in the memory to collect asset information of the target machine,
wherein the load information comprises energy load information,
wherein the side-channel data is power consumption data,
wherein deriving comprises deriving the energy load information by processing the power consumption data,
wherein generating comprises generating the allow list including the scan timing and the scan range by referencing the energy load information, and
wherein the computer-implemented information collection method comprises determining that the active scan is executable on the target machine when the energy load information is lower than a threshold.

9. A non-transitory computer-readable storage medium storing a program that causes a computer to execute instructions to:
derive load information to estimate an impact on the availability of a target machine for active scanning by using side-channel data;
generate an allow list including a scan timing and a scan range in which the availability is not affected, the allow list being based on the load information; and
store the allow list in memory,
wherein an active scan of the target machine is executed by referencing the allow list stored in the memory to collect asset information of the target machine,
wherein the load information comprises energy load information,
wherein the side-channel data is power consumption data,
wherein deriving load information comprises deriving the energy load information by processing the power consumption data,
wherein generating the allow list comprises generating the allow list including the scan timing and the scan range by referencing the energy load information; and
determine that the active scan is executable on the target machine when the energy load information is lower than a threshold.

* * * * *